(12) United States Patent
Motoshige et al.

(10) Patent No.: US 8,076,415 B2
(45) Date of Patent: Dec. 13, 2011

(54) MOLDING MATERIAL AND MOLDED ARTICLE FOR LASER FUSION

(75) Inventors: Ryoichi Motoshige, Tokyo (JP); Wataru Kakuno, Tokyo (JP)

(73) Assignee: Techno Poly,er Co., Ltd., Chuo-ku, Tokyo (JP)

( * ) Notice: Subject to any disclaimer, the term of this patent is extended or adjusted under 35 U.S.C. 154(b) by 363 days.

(21) Appl. No.: 10/544,379

(22) PCT Filed: Jan. 29, 2004

(86) PCT No.: PCT/JP2004/000791
§ 371 (c)(1),
(2), (4) Date: Aug. 3, 2005

(87) PCT Pub. No.: WO2004/069927
PCT Pub. Date: Aug. 19, 2004

(65) Prior Publication Data
US 2006/0155067 A1 Jul. 13, 2006

(30) Foreign Application Priority Data
Feb. 4, 2003 (JP) ................................. 2003-026659

(51) Int. Cl.
*C08F 8/00* (2006.01)
*C08L 9/00* (2006.01)
*C08L 23/04* (2006.01)
*C08L 23/10* (2006.01)
*C08L 25/02* (2006.01)

(52) U.S. Cl. ......... 525/191; 525/232; 525/240; 525/241

(58) Field of Classification Search .................. 525/191, 525/232, 240, 241
See application file for complete search history.

(56) References Cited

U.S. PATENT DOCUMENTS

| | | | |
|---|---|---|---|
| 4,172,103 A | 10/1979 | Serini et al. | |
| 4,224,419 A | 9/1980 | Swoboda et al. | |
| 4,282,334 A * | 8/1981 | Walter et al. ..................... | 525/53 |
| 4,287,316 A | 9/1981 | Kaneko et al. | |
| 4,373,064 A | 2/1983 | Bennett, Jr. et al. | |
| 4,513,120 A | 4/1985 | Bennett, Jr. et al. | |
| 6,071,992 A * | 6/2000 | Okada et al. .................. | 524/139 |
| 6,384,133 B1 | 5/2002 | Eichenauer | |

FOREIGN PATENT DOCUMENTS

| | | |
|---|---|---|
| EP | 0 074 112 A1 | 3/1983 |
| EP | 1 418 202 A2 | 5/2004 |
| JP | 58083044 A | 5/1983 |
| JP | 58098354 A | 6/1983 |
| JP | 2001-26656 A | 1/2001 |
| JP | 2001-71384 A | 3/2001 |
| JP | 2002-284895 A | 10/2002 |
| JP | 2002284895 | 10/2002 |
| JP | 2003-238712 A | 8/2003 |
| JP | 2004 067841 | 3/2004 |
| JP | 2004-67841 A | 3/2004 |
| JP | 2004 168997 | 6/2004 |
| JP | 2004 182835 | 7/2004 |
| JP | 2004-182835 A | 7/2004 |
| JP | 2004-250621 A | 9/2004 |
| WO | WO 01/62843 A2 | 8/2001 |

OTHER PUBLICATIONS

DynaLab, Technical Information Sheet, Plastic Properties of Acrylonitrile Butadiene Styrene (ABS), from website, downloaded Jun. 29, 2011.
Acrylonitrile Butadiene Styrene, Wikipedia, (last modified, May 29, 2011).

* cited by examiner

Primary Examiner — Nathan M Nutter
(74) Attorney, Agent, or Firm — Fitch, Even, Tabin & Flannery

(57) ABSTRACT

A molding material and a molded article for laser welding are provided, which comprise a thermoplastic resin (A) comprising a rubber-reinforced resin (A1) obtained by polymerizing a vinyl monomer in a presence of a rubber-like polymer (a), or a composition (A2) of the rubber-reinforced resin (A1) and a (co)polymer (b) of a vinyl monomer, and which have a light transmittance at a wavelength of 808 nm in a range of 5% or higher when molded into a 4 mm-thick sample piece. The rubber-like polymer (a) dispersed in the thermoplastic resin (A) preferably has a weight average particle size of 50 to 220 nm, and preferably comprises particles of 300 nm or larger in diameter in an amount of 0 to 20 wt % relative to 100 wt % of the component (a). A laser light can transmit the molding material and the molded article, and allow the molding material and the molded article to be laser-welded with various resin moldings.

10 Claims, 1 Drawing Sheet

MOLDING MATERIAL AND MOLDED ARTICLE FOR LASER FUSION

This Application is the National Phase of International Application No. PCT/JP2004/000791 filed Jan. 29, 2004, which designated the U.S. and was not published under PCT Article 21(2) in English, and this application claims, via the aforesaid International Application, the foreign priority benefit of and claims the priority from Japanese Application No. 2003-026659, filed Feb. 4, 2003, the complete disclosures of which are incorporated herein by reference.

TECHNICAL FIELD

The present invention relates to molding materials and molded articles suitable to be joined by laser welding, and particularly to molding materials and molded articles containing rubber-reinforced resins.

BACKGROUND ART

As methods for joining molded articles made of thermoplastic resins together, welding techniques have conventionally been known including hot plate welding, vibration welding, ultrasonic welding and laser welding, aside from methods that employ fastening parts (bolts, screws, clips and the like) or adhesives. The hot plate welding is a technique in which areas to be welded of molded articles are brought into contact with heated plates so as to be molten, and the molten areas are pressed against each other before cooling and solidifying. However, this technique often forms threads when the areas to be welded are separated from the heated plates, affecting appearance of molded articles. The vibration welding and ultrasonic welding are techniques in which one article is fixed, and the other article is pressed thereon while vibration or ultrasonic wave is applied, so that the areas to be welded are molten and welded by friction energy. However, these techniques often cause dust and thread-like flashes in the welded areas or cause bent flashes or other problems. As a result, molded articles are often degraded in appearance and become unusable depending on shape of the articles.

The laser welding is a method in which one of the articles to be welded is formed of a laser-absorbing material whilst the other is formed of a laser-transmitting material, and they are stacked together and then subjected to irradiation with laser light on the side of the laser-transmitting material. Thus, the laser light which has passed through the transmitting material heats up and melts the surface of the laser-absorbing material, and also melts the laser transmitting material by heat transfer, so that the two resins are welded together (See, Japanese Patent Laid-Open Publication No. 2001-71384). This technique is advantageous in that no threads, dust or flashes are formed, the resulting welded areas have good appearance, and it can be used to weld molded articles of various shapes. Nonetheless, the technique has a limitation in that one of the articles to be welded must be formed of a laser-transmitting molding material Rubber-reinforced styrenic resins represented by acrylonitrile-butadiene-styrene (ABS) resins, high impact polystyrenes (HIPS) and the like are excellent in mechanical properties, physical properties, electrical properties and the like, and are therefore used in a wide range of fields such as of electrics or electronics, office automation or household electrical appliances, automobiles, and sanitary fittings. However, these resins are low in transmittance of laser light and therefore cannot be used in laser welding unless they are welded with an article made of a laser-transmitting material.

DISCLOSURE OF THE INVENTION

Accordingly, it is an object of the present invention to provide molding materials and molded articles which comprise a thermoplastic resin containing a rubber-reinforced resin and which can transmit laser light and thus can be laser-welded to various resinous molded articles.

The present inventors have intensively studied rubber-reinforced resins in terms of particle size and its distribution of rubber-like polymers dispersed in the resins and, as a result, have found that when the particle size and distribution thereof fall in particular ranges, the rubber-reinforced resins transmit laser light sufficiently to be laser-welded. Thus, the present invention has been completed.

Specifically, in accordance with one aspect of the present invention, there is provided a molding material for laser welding, comprising a thermoplastic resin (A) which comprises:
a rubber-reinforced resin (A1) obtained by polymerizing a vinyl monomer in a presence of a rubber-like polymer (a),
or a composition (A2) comprising said rubber-reinforced resin (A1) and a (co)polymer (b) of a vinyl monomer,
wherein said molding material has a light transmittance at a wavelength of 808 nm in a range of 5% or higher when the material is molded into a 4 mm-thick sample piece. From the viewpoint of laser-weldability, the above light transmittance is preferably 7% or higher, more preferably 10% or higher, and particularly preferably 12% or higher. Meanwhile, in the present specification, the term "(co)polymer" refers to homopolymer and/or copolymer.

In accordance with another aspect of the present invention, there is provided a molding material for laser welding, comprising a thermoplastic resin (A) which comprises:
a rubber-reinforced resin (A1) obtained by polymerizing a vinyl monomer in a presence of a rubber-like polymer (a),
or a composition (A2) comprising said rubber-reinforced resin (A1) and a (co)polymer (b) of a vinyl monomer,
wherein said rubber-like polymer (a) dispersed in said thermoplastic resin has a weight average particle size of 50 to 220 nm. Preferably, the rubber-like polymer (a) contained in the molding material comprises particles of 300 nm or larger in diameter in an amount of 0 to 20 wt % relative to 100 wt % of the component (a).

In accordance with still another aspect of the present invention, there is provided a molded article for laser welding, which is formed of the above-described molding material for laser welding.

BEST MODE FOR CARRYING OUT THE INVENTION

The thermoplastic resin (A) for use in the present invention contains either a rubber-reinforced resin (A1) obtained by polymerizing a vinyl monomer in a presence of a rubber-like polymer (a), or a composition (A2) comprising the rubber-reinforced resin (A1) and a (co)polymer (b) of a vinyl monomer.

The component (A1) for use in the present invention is preferably a rubber-reinforced vinyl resin obtained by polymerizing 95 to 30 wt % of a vinyl monomer in a presence of 5 to 70 wt % of a rubber-like polymer (a). (In this case, the total of the rubber-like polymer (a) and the vinyl monomer is 100 wt %.)

Examples of the rubber-like polymer (a) include diene (co)polymers such as polybutadiene, butadiene-styrene copolymer, butadiene-acrylonitrile copolymer, butadiene-acryl copolymer, styrene-butadiene-styrene block copolymer, styrene-isoprene-styrene block copolymer, and isobutylene-isoprene copolymer, hydrogenated products of these diene (co)polymers, ethylene-α-olefin or ethylene-α-olefin-non-conjugated diene copolymers (for example, ethylene-propylene-copolymer, ethylene-propylene-non-conjugated diene copolymer, ethylene-butene-1 copolymer, ethylene-butene-1-non-conjugated diene copolymer), polyurethane rubbers, acryl rubbers, and silicone rubbers. These may be used singly or in combination of two or more. Of these rubber-like polymers, preferred are diene (co)polymers, hydrogenated products of diene (co)polymers, ethylene-α-olefin or ethylene-α-olefin-non-conjugated diene copolymers, acryl rubbers and silicone rubbers, and diene (co)polymers are particularly preferred.

The rubber-like polymer (a) is present in the rubber-reinforced resin (A1) of the present invention in an amount of 5 to 70 wt %, preferably in an amount of 5 to 65 wt %. If the amount of the rubber-like polymer (a) is less than 5 wt %, then impact resistance is decreased. If it is greater than 70 wt %, appearance of molded articles is deteriorated.

The rubber-like polymer (a) dispersed in the rubber-reinforced resin (A1) of the present invention has a weight average particle size typically in the range of 50 to 220 nm, preferably 80 to 210 nm, more preferably 100 to 200 nm, and particularly preferably 150 to 190 nm. If the weight average particle size is larger than 220 nm, laser light transmittance of the molding material is lowered. As a result, it becomes difficult for the molding material to transmit laser light for laser welding. If the weight average particle size is less than 50 nm, impact resistance is degraded. To ensure uniform transmittance of laser light, it is preferred that the rubber-like polymer (a) comprises particles of 300 nm or larger in diameter in an amount of 0 to 20 wt % relative to 100 wt % of the component (a).

The rubber-like polymer (a) for use in the present invention is preferably one obtained by emulsion polymerization. The molding material that satisfies the above-described particle size requirements can be produced, for example, by suitably setting conditions of the polymerization so that the latex produced during the emulsion polymerization of the rubber-like polymer (a) satisfies the above-described particle size requirements. Alternatively, the rubber-like polymer that satisfies the above particle size requirements can be obtained by properly mixing a rubber-like polymer consisting of latex having a small weight average particle size with a rubber-like polymer consisting of latex having a large weight average particle size.

The vinyl monomer used in the component (A1) of the present invention preferably comprises at least one monomer selected from the group consisting of aromatic vinyl compounds, vinyl cyanide compounds, and other vinyl compounds that are copolymerizable with these compounds.

Examples of the aromatic vinyl compound include styrene, α-methylstyrene, o-methylstyrene, p-methylstyrene, vinyltoluene, methyl-α-methylstyrene, styrene bromide, and hydroxystyrene. Of these, styrene and α-methylstyrene are preferred.

Examples of the vinyl cyanide compound include acrylonitrile and methacrylonitrile. Of these, acrylonitrile is preferred.

Examples of other vinyl monomers that are copolymerizable with aromatic vinyl compounds or vinyl cyanide compounds include, for example, (meth)acrylates and maleimide compounds, as well as unsaturated compounds containing various functional groups such as acid anhydride group-containing unsaturated compounds, hydroxyl group-containing unsaturated compounds, carboxyl group-containing unsaturated compounds, epoxy group-containing unsaturated compounds, and oxazoline group-containing unsaturated compounds. The term "(meth)acrylic acid" as used herein refers to acrylic acid and/or methacrylic acid.

Examples of the (meth)acrylate include methyl acrylate, ethyl acrylate, butyl acrylate, methyl methacrylate, ethyl methacrylate, and butyl methacrylate.

Examples of the maleimide compounds include maleimide, N-methylmaleimide, N-butylmaleimide, N-phenylmaleimide, N-(4-hydroxyphenyl)maleimide, and N-cyclohexylmaleimide. These maleimide compounds may be introduced by a method in which maleic anhydride is copolymerized, and then followed by imidation.

Examples of the acid anhydride group-containing unsaturated compound include maleic anhydride, itaconic anhydride, and citraconic anhydride.

Examples of the hydroxyl group-containing unsaturated compound include 3-hydroxy-1-propene, 4-hydroxy-1-butene, cis-4-hydroxy-2-butene, trans-4-hydroxy-2-butene, 3-hydroxy-2-methyl-1-propene, 2-hydroxyethylacrylate, 2-hydroxyethylmethacrylate, hydroxystyrene, and N-(4-hydroxyphenyl)maleimide.

Examples of the carboxyl group-containing unsaturated compound include acrylic acids and methacrylic acids.

Examples of the epoxy group-containing unsaturated compound include glycidyl acrylates, glycidyl methacrylates, and allyl glycidyl ethers.

Examples of the oxazoline group-containing unsaturated compound include vinyloxazolines.

The above-described vinyl monomers can be used singly or in combination of two or more.

Preferred vinyl monomers are those containing an aromatic vinyl compound as an essential component. Examples include styrene, a combination of styrene and acrylonitrile, a combination of α-methylstyrene, acrylonitrile and methylmethacrylate, and a combination of styrene and methylmethacrylate. Particularly preferred are combinations of aromatic vinyl compounds and vinyl cyanide compounds, in particular, a combination of styrene and acrylonitrile.

Blending proportion of the aromatic vinyl compound to the vinyl cyanide compound is preferably 100-50/0-50 wt % as aromatic vinyl compound/vinyl cyanide compound, more preferably 95-50/5-50 wt %, and particularly preferably 75-65/25-35 wt %. Blending proportion of the other copolymerizable monomers is 0 to 50 wt %, preferably 0 to 40 wt % relative to the component (A1).

The amount of the vinyl monomer relative to the component (A1) of the present invention is 30 to 95 wt %, preferably 35 to 95 wt %. If the amount is greater than 95 wt %, then impact resistance is decreased. If it is less than 30 wt %, appearance of molded articles is degraded.

The component (A1) of the present invention can be polymerized by use of known polymerization processes such as emulsion polymerization, bulk polymerization, solution polymerization, suspension polymerization, and combinations thereof. One obtained by emulsion polymerization is particularly preferred in order to achieve the object of the present invention.

Upon production by the emulsion polymerization, a polymerization initiator, a chain transfer agent, an emulsifier, and water are used. These may be any of known ones. Polymerization of the vinyl monomer in the presence of the rubber-like polymer (a) may be effected by adding the vinyl monomer as a whole, discontinuously or continuously to the entire amount of the rubber-like polymer (a), or these addition techniques may be combined. Alternatively, all or part of the rubber-like polymer (a) may be added and polymerized during the polymerization process.

Examples of the polymerization initiator include, for example, cumene hydroperoxide, diisopropylbenzene hydroperoxide, potassium persulfate, azobisisobutylonitrile, benzoyl peroxide, lauroyl peroxide, t-butylperoxy laurate, and t-butylperoxy monocarbonate.

Examples of the chain transfer agent include, for example, octyl mercaptan, n-dodecylmercaptan, t-dodecylmercaptan, n-hexylmercaptan, tetraethylthiuram sulfide, acrolein, methacrolein, allyl alcohol, and 2-ethylhexylthioglycol.

Examples of the emulsifier used in the emulsion polymerization process include, for example, sulfuric acid esters of higher alcohols, alkylbenzenesulfonic acid salts such as sodium dodecylbenzenesulfonate, aliphatic sulfonic acid salts such as sodium lauryl sulfate, anionic surfactants such as salts of higher aliphatic carboxylic acids, salts of rosin acids and salts of phosphoric acids, and known nonionic surfactants.

In the emulsion polymerization process, a coagulating agent is generally used to obtain powder which is then washed with water and dried to give powdery rubber-reinforced resins. The coagulating agent used for this purpose may be an inorganic salt such as calcium chloride, magnesium sulfate, and magnesium chloride, or an acid such as sulfuric acid, hydrochloric acid, and acetic acid.

In the bulk polymerization, solution polymerization and suspension polymerization processes, various solvents, suspending agents, polymerization initiators, chain transfer agents, and other agents are used. These agents may be any of known agents.

When the component (A1) of the present invention is obtained by emulsion polymerization, the rubber-like polymer is, in most cases, one obtained by emulsion polymerization. In such cases, the gel content of the rubber-like polymer is typically 98 wt % or less, preferably 40 to 98 wt %, more preferably 50 to 95 wt %, and particularly preferably 60 to 90 wt %. When the gel content is 40 to 98 wt %, thermoplastic resin compositions which provide molded articles particularly excellent in impact resistance and surface appearance can be obtained.

In determining the above-described gel content, 1 gram of the rubber-like polymer is added to 100 ml of toluene. The mixture is allowed to stand for 48 hours at room temperature and is then filtered through a 100 mesh screen (weight=$W_1$). The insoluble matter in toluene and the screen are dried under vacuum at 80° C. for 6 hours and are weighed (weight=$W_2$). The gel content can then be determined by the following equation:

Gel content (%)=[{$W_2(g)-W_1(g)$}/1(g)]×100.

The gel content can be adjusted by properly setting type and amount of the molecular weight-adjusting agent, time and temperature for polymerization, and polymerization conversion rate, when the rubber-like polymer is produced.

Graft ratio of the component (A1) of the present invention is preferably 20 to 200 wt %, more preferably 30 to 150 wt %, and particularly preferably 40 to 120 wt %. The graft ratio (%) can be obtained by the following equation:

Graft ratio (%)={$(T-S)/S$}×100

In the above equation, T is determined as follows: 1 gram of the component (A1) is added to 20 ml of acetone. The mixture is shaken by a shaker for 2 hours and is then centrifuged for 60 min (23,000 rpm) to separate soluble and insoluble matters. T is then given as the weight (g) of the insoluble matter. S is the weight (g) of the rubber-like polymer present in 1 gram of the component (A1).

Limiting viscosity [η] of the acetone-soluble matter of the component (A1) (determined at 30° C. using methyl ethyl ketone as solvent) is preferably 0.2 to 1.2 dl/g, more preferably 0.2 to 1 dl/g, and particularly preferably 0.3 to 0.8 dl/g.

The component (A2) of the present invention is a composition obtained by blending the above-described rubber-reinforced resin (A1) with a (co)polymer (b) of a vinyl monomer.

The vinyl monomer used in the component (b) of the present invention preferably comprises at least one monomer selected from the group consisting of aromatic vinyl compounds, vinyl cyanide compounds, and other vinyl compounds that are copolymerizable with these compounds.

The aromatic compound and the vinyl cyanide compound may be any of those described with respect to the component (A1).

The other vinyl compounds that are copolymerizable with the aromatic compound or the vinyl cyanide compound may be any of those described with respect to the component (A1).

These vinyl monomers may be used singly or in combination or two or more.

Preferred (co)polymers (b) for use in the component (A2) of the present invention are those containing an aromatic vinyl compound as an essential component. Examples of the preferred (co)polymers include, for example, homopolymers of aromatic vinyl compounds and copolymers of aromatic vinyl compounds and at least one vinyl monomer selected from vinyl cyanide compounds, (meth)acrylates, maleimide compounds and acid anhydride group-containing unsaturated compounds. Of these, particularly preferred are copolymers composed of monomers containing an aromatic vinyl compound and a vinyl cyanide compound as essential components, in particular, styrene-acrylonitrile copolymer, styrene-acrylonitrile-methyl methacrylate copolymer, and styrene-acrylonitrile-maleimide compound copolymer.

Blending proportion of the aromatic vinyl compound to the vinyl cyanide compound used in the component (b) is preferably 95-50/5-50 wt % as aromatic vinyl compound/vinyl cyanide compound, and more preferably 75-65/25-35 wt %, from the viewpoint of balance between properties and processability.

In the present invention, the vinyl (co)polymer (b) is added to the component (A2) in a predetermined amount so that the content of the rubber-like polymer (a) originating from the component (A1) is preferably 5 to 40 wt %, more preferably 5 to 35 wt %, and particularly preferably 7 to 30 wt % relative to 100 wt % of the component (A2). If the content of the rubber-like polymer (a) is smaller than the above-specified range, then the impact resistance is deteriorated. If the content is larger than the above-specified range, then appearance of the surface of molded articles is deteriorated.

The component (b) of the present invention can be produced by use of known polymerization processes such as emulsion polymerization, bulk polymerization, solution polymerization, suspension polymerization, and combinations thereof.

When the component (b) is produced by emulsion polymerization, the process described with respect to the component (A1) can be used.

The solvent used in solution polymerization may be an inactive polymerization solvent used in common radical polymerization. Examples include aromatic hydrocarbons such as ethylbenzene and toluene, ketones such as methyl ethyl ketone and acetone, halogenated hydrocarbons such as dichloromethylene and carbon tetrachloride, acetonitrile, dimethylformamide, and N-methylpyrrolidone. Polymerization temperature is preferably 80 to 140° C., more preferably 85 to 130° C., and particularly preferably 90 to 120° C.

The polymerization may be carried out by thermal polymerization technique without use of a polymerization initiator, or may be carried out by use of a polymerization initiator. As the polymerization initiator, organic peroxides such as ketone peroxides, dialkyl peroxides, diacyl peroxides, peroxy esters and hydroperoxides are preferably used. Examples of the chain transfer agent include mercaptanes and α-methyl-styrene dimer.

In bulk polymerization, all the polymerization initiators and the chain transfer agents described with respect to the solution polymerization can be used.

The limiting viscosity [η] of the component (b) (determined at 30° C. using methyl ethyl ketone as solvent) is preferably 0.2 to 1.2 dl/g, more preferably 0.2 to 1 dl/g, and particularly preferably 0.3 to 0.8 dl/g.

The component (A2) of the present invention can be produced by properly mixing the component (b) with the component (A1).

The amount of the monomer that ultimately remains in the component (A1) and the component (A2) is preferably 10,000 ppm or less, and more preferably 5,000 ppm or less.

In the present invention, content of the rubber-like polymer (a) in the component (A) is preferably 5 to 40 wt %, more preferably 5 to 35 wt %, and particularly preferably 7 to 30 wt % relative to 100 wt % of the component (A). If the content is smaller than the above-specified range, then impact resistance is decreased. If the content is larger than the above-specified range, then shapability and appearance of the surface of molded articles are degraded.

To the thermoplastic resin (A) of the present invention, may further be added additives such as inorganic fillers, metal powders, reinforcing agents, plasticizers, compatibilizers, heat stabilizers, light stabilizers, antioxidants, UV absorbers, dyes, pigments, antistats, lubricants, and flame retardants, depending on intended purpose and application, as long as light transmittance is not affected.

To the thermoplastic resin (A) of the present invention, may further be added other polymers (B) which include, for example, polycarbonate resins, polyester resins, polyamide resins, polyamide elastomers, polyester elastomers, polyethylene, polypropylene, polyphenylene ethers, polyarylene sulfides, POMs (polyacetals), phenol resins, epoxy resins and LCPs (liquid crystal polymers), without departing from the purposes of the present invention.

The molding material of the present invention can be produced by melting and kneading together the respective components by various extruders, Henschel mixer, Banbury mixer, kneader, roll, feeder ruder or the like. Production processes using an extruder, Henschel mixer, or Banbury mixer are preferable.

Further, when the respective components are kneaded, all the components may be kneaded at once, or the components may be gradually fed and kneaded in multiple steps using an extruder, Henschel mixer, or Banbury mixer.

The products kneaded in Henschel mixer, Banbury mixer, kneader or the like may be further made into pellets in an extruder.

The molding material of the present invention can be molded into molded articles by any of known molding techniques, including injection molding, press molding, sheet extrusion molding, vacuum molding, contour extrusion molding, and expansion molding.

The molded article of the present invention can be laser-welded with another resinous molded article by laying the present molded article on a laser-absorbing resinous molded article and irradiating the present molded article with laser light. The laser light which can be used includes laser light of glass:neodymium3+ laser, YAG:neodymium3+ laser, ruby laser, helium-neon laser, krypton laser, argon laser, H2 laser, N2 laser and semiconductor laser. Of these, semiconductor laser is preferred. The wavelength of the laser light is preferably 1060 nm or shorter although it may vary depending upon resinous molded articles. If the wavelength of laser light is longer than 1060 nm, it becomes difficult to melt the surfaces to be welded. Power of laser light is preferably 5 to 100 W. The power of the laser light lower than 5 W is too low to melt the surfaces to be welded of the resinous molded articles. The power higher than 100 W is excessive and may evaporate or degenerate the molding material.

EXAMPLES

Figure 1:
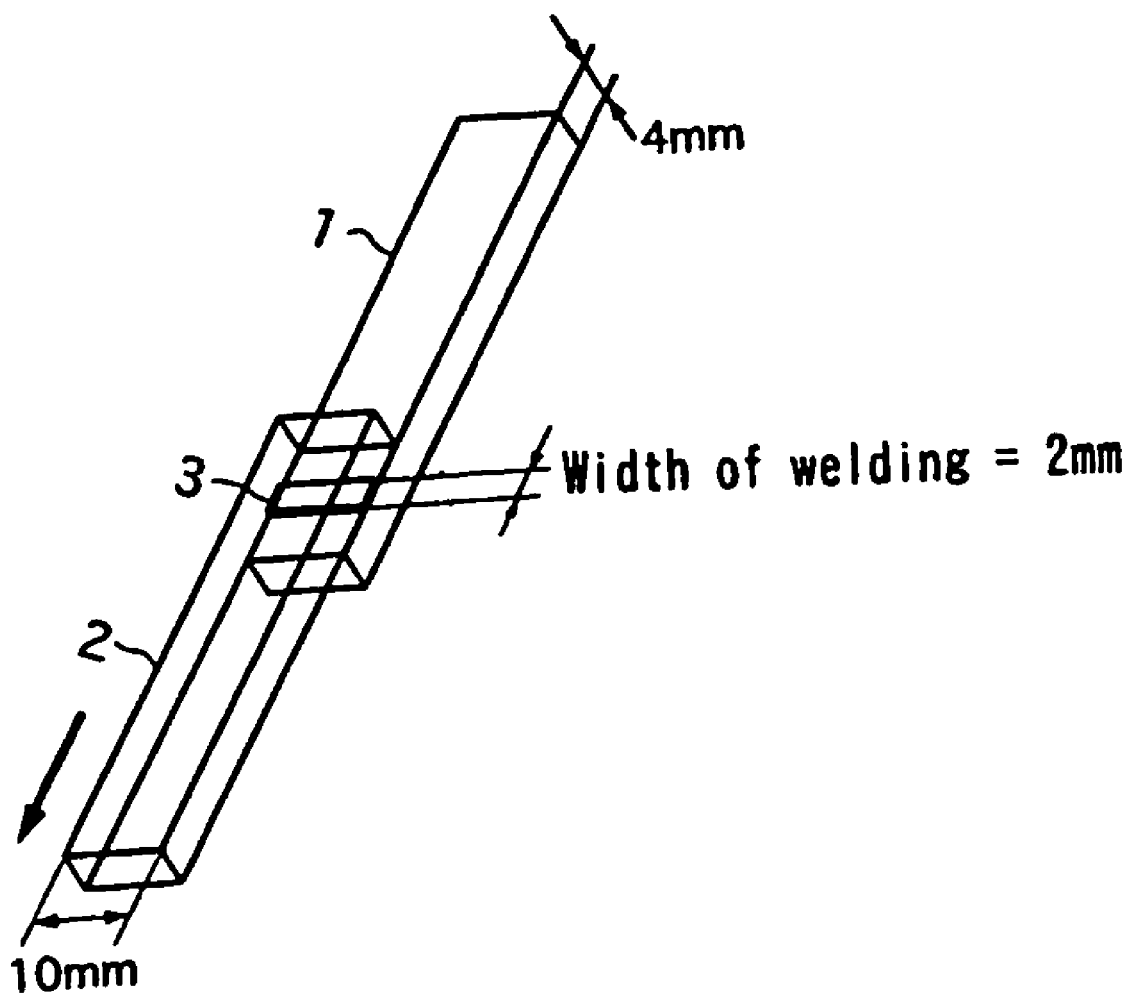
FIG. 1 is a schematic diagram showing the method for evaluation of weldability.

Hereinafter, the present invention will be described in more detail with reference to examples. It should be construed that the present are not limited to the following examples.

In the following examples, parts and percentages are on weight basis unless otherwise specified. In the examples, evaluations were made in the following manner.

(1) Evaluation Method (1-1) Measurement of Light Transmittance

Pellets that had been produced were pressed at 240° C. for 5 min to form a 4 mm thick, 10 mm wide sample piece. Using a spectrophotometer (MPS-2000, Shimadzu Corporation), the sample piece was measured for transmittance of light at a wavelength of 808 nm.

(1-2) Weight Average Particle Size and Proportion of Particles Sized 300 nm or Larger of Rubber-Like Polymer Particle size of the rubber-like polymer was obtained by measuring particle size of produced latex in a state of emulsion, using a particle size analyzer UPA 150 (trade name) manufactured by Nikkiso Co., Ltd. It had previously been confirmed by electron microscopy that the measured particle size corresponds to the particle size of particles dispersed in the resin. Proportion of particles sized 300 nm or larger of the rubber-like polymer was determined relative to 100% of the whole rubber-like polymer.

(1-3) Graft Ratio of the Component (A) (Rubber-Reinforced Resin)

This was determined in the manner described above.

(1-4) Evaluation of Weldability

As shown in FIG. 1, a sample piece 2 fabricated in the same manner as in (1-1) was laid on a piece 1 to be welded. The piece 1 had the same dimension as the piece 2. Using a laser welder NOVOLAS-C manufactured by Leister, laser light was irradiated onto the sample piece 2 under the following conditions to weld the sample piece 2 to the piece 1.

<Conditions for Laser Welding>

Laser power=16 A

Speed=30 mm/sec

Weld width=2 mm

Weld length=10 mm

Pressure=7 kg/cm$^2$

With a tensile tester, one of the welded piece 1 and the sample piece 2 was pulled in the direction indicated by an arrow in FIG. 1 at a speed of 2 mm/min while the other piece was fixed. State of destruction of the weld area 3 was observed and evaluated on weldability according to the following criteria:

○: Weld strength was high enough to break the piece body;
Δ: Peeling occurred at the interface of the pieces, and the piece body was also broken;
X: Peeling occurred at the interface of the pieces.

(2) Components of Thermoplastic Resin Composition

Production Example a-1

Production of Rubber-like Polymer 1

A 5-liter stainless steel autoclave equipped with a reflux condenser, a stirrer, an additive feeder, a thermometer and the like was provided. 150 parts of deionized water, 4.0 parts of higher fatty acid soap (sodium salt of fatty acids composed mainly of a fatty acid with 18 carbon atoms), and 0.075 part of sodium hydroxide were placed in the autoclave. The atmosphere inside the autoclave was replaced with nitrogen and the mixture was heated to 68° C. while being stirred. Subsequently, 20% of a monomer mixture composed of 100 parts of 1,3-butadiene (BD) and 0.3 parts of t-dodecylmercaptan (TDM) was added, followed by addition of 0.135 part of potassium persulfate. The mixture generated heat after a few minutes to indicate initiation of polymerization. One hour after the addition of potassium persulfate, continuous addition of the remaining 80% of the monomer mixture was started. The monomer mixture was added over 6 hours. Following the continuous addition of the monomer mixture, the internal temperature was raised to 80° C. and the reaction was allowed to proceed at this temperature for 1 hour, and then the polymerization reaction was terminated. The resulting rubber-like polymer latex had a weight average particle size of 180 nm. 2.0% of the particles were sized 300 nm or more.

Production Example a-2

Production of Rubber-Like Polymer 2

Polymerization reaction was carried out in the same manner as in Production Example a-1, except that 0.5 part of sodium carbonate was added at the beginning of the reaction. The resulting rubber-like polymer latex had a weight average particle size of 500 nm. 80% of the particles were sized 300 nm or more.

Production Examples A-1 through A-4

Production of Rubber-Reinforced Resins

Emulsion polymerization was carried out using the rubber-like polymers, styrene monomer, and acrylonitrile monomer in accordance with the proportions shown in Table 1. Subsequently, magnesium sulfate was added to coagulate the reaction mixture, and the solid product was washed and dried to give a rubber-reinforced resin (Designated as ABS 1-4 in Tables). The graft ratio of each rubber-reinforced resin was shown in Table 1.

Production Example A-5

Production of Styrene-Acrylonitrile Copolymers

Solution polymerization was carried out using styrene monomer and acrylonitrile monomer in accordance with the proportions shown in Table 1, to give a styrene-acrylonitrile copolymer (Designated as AS1 in Table 1).

TABLE 1

|  | ABS1 (Part by weight) | ABS2 (Part by weight) | ABS3 (Part by weight) | ABS4 (Part by weight) | AS1 (Part by weight) | AS2 (Part by weight) |
| --- | --- | --- | --- | --- | --- | --- |
| Rubber-like polymer 1[*1] | 40 | 38 | 36 | 24 | — | — |
| Rubber-like polymer 2[*2] | — | 2 | 4 | 16 | — | — |
| Styrene monomer | 42 | 42 | 42 | 42 | 70 | 43 |
| Acrylonitrile monomer | 18 | 18 | 18 | 18 | 30 | — |
| N-phenylmaleimide | — | — | — | — | — | 55 |
| Maleic anhydride monomer | — | — | — | — | — | 2 |
| Weight average particle size (nm) of rubber-like polymer | 180 | 196 | 212 | 308 | — | — |
| Proportion (%) of particles sized 300 nm or larger in the particles of rubber-like polymer | 2.0 | 5.9 | 9.8 | 33.2 | — | — |
| Graft ratio (%) | 90 | 80 | 70 | 60 | — | — |

[*1]Weight average particle size = 180 nm
[*2]Weight average particle size = 500 nm Examples 1-3, and Comparative Example 1

The respective components were loaded in a Henschel mixer in accordance with the proportions shown in Table 2, along with 0.2 part of a lubricant and 0.3 part of an antioxidant. After mixing, the mixture was melted and kneaded by a twin screw extruder (TEM50A, Toshiba Machine Co., Ltd.) at 220 to 250° C. to obtain a resin composition as pellets. The resin composition was then subjected to the measurement for transmittance and the evaluation on weldability in the manners described above. Upon evaluation of weldability, a piece to be welded was prepared as follows: A molded article (light transmittance=lower than 1%) was obtained by preparing a resin composition in the same manner as described above except that 100 parts of a commercially available ABS resin (trade name: Techno ABS130) was used together with 0.2 part of the lubricant and 0.3 part of the antioxidant, and then molding the resultant resin composition in the same manner as in (1-1) above. The results are shown in Table 2.

Example 4

A resin composition was obtained in the same manner as in Example 1, except that a styrene-N-phenylmaleimide-maleic anhydride copolymer (Malecca MS-N (trade name), Denki Kagaku Kogyo K. K., designated as AS2 in Tables) was used instead of the styrene-acrylonitrile copolymer. This resin composition was subjected to the measurement for transmittance and the evaluation on weldability in the same manner as in Example 1. The results are shown in Table 2 below.

TABLE 2

|  | Example 1 | Example 2 | Example 3 | Example 4 | Comparative Example 1 |
|---|---|---|---|---|---|
| ABS1 (Part by weight) | 50 | — | — | 50 | — |
| ABS2 (Part by weight) | — | 50 | — | — | — |
| ABS3 (Part by weight) | — | — | 50 | — | — |
| ABS4 (Part by weight) | — | — | — | — | 50 |
| AS1 (Part by weight) | 50 | 50 | 50 | — | 50 |
| AS2 (Part by weight) | — | — | — | 50 | — |
| Light transmittance (%) | 32 | 17 | 10 | 29 | 3 |
| Weldability evaluation | ○ | ○ | Δ | ○ | x |

The resin compositions of Examples 1 through 4, each showing a light transmittance of 5% or higher, were all good in weldability. In contrast, the resin composition of Comparative Example 1 having a light transmittance of lower than 5% did not transmit enough laser light to achieve laser welding. A comparison of weldability between Example 2 and Example 3 revealed that when the light transparency is 10% or higher, excellent laser weldability is achieved.

INDUSTRIAL APPLICABILITY

The rubber-reinforced resin with high transmittance of laser light according to the present invention permits laser-welding of a molded article molded from the rubber-reinforced resin to a molded article molded from a laser-absorbing resin.

The invention claimed is:

1. A molding material for laser welding consisting essentially of:
a thermoplastic resin (A) consisting essentially of:
a rubber-reinforced resin (A1) obtained by polymerizing styrene and acrylonitrile in the presence of a rubbery polymer (a) consisting essentially of polybutadiene, or
a composition (A2) consisting essentially of said rubber-reinforced resin (A1) and
a (co)polymer (b) of styrene and acrylonitrile, wherein
said rubbery polymer (a) is dispersed in said thermoplastic resin, has a weight average particle size of 150 to 200 nm, and comprises particles of 300 nm or larger in diameter in an amount of 2 to 20 wt % relative to 100 wt % of said component (a),
said molding material having a laser light transmittance at a wavelength of 808 nm in a range of 5% to 32% when the material is molded into a 4 mm thick sample, and
the proportion of styrene to acrylonitrile in said thermoplastic resin (A) is from about 75-65/25-35 wt %.

2. The molding material for laser welding according to claim 1, wherein said rubbery polymer (a) dispersed in said thermoplastic resin has a weight average particle size of 150 to 190 nm.

3. The molding material for laser welding according to claim 1, wherein said rubbery polymer (a) dispersed in said thermoplastic resin comprises particles of 300 nm or larger in diameter in an amount of 2 to 5.9 wt % relative to 100 wt % of said component (a).

4. The molding material for laser welding according to claim 2, wherein said rubbery polymer (a) dispersed in said thermoplastic resin comprises particles of 300 nm or larger in diameter in an amount of 2 to 5.9 wt % relative to 100 wt % of said component (a).

5. The molding material for laser welding according to claim 3, wherein said rubbery polymer (a) is obtained by mixing a rubber-like polymer consisting of latex having a small weight average particle size with a rubber-like polymer consisting of latex having a large weight average particle size.

6. The molding material for laser welding according to claim 4, wherein said rubbery polymer (a) is obtained by mixing a rubber-like polymer consisting of latex having a small weight average particle size with a rubber-like polymer consisting of latex having a large weight average particle size.

7. The molding material for laser welding according to any one of claims 1 and 2-6, wherein said thermoplastic resin (A) consists essentially of said rubber-reinforced resin (A1).

8. The molding material for laser welding according to any one of claims 1 and 2-6, wherein said thermoplastic resin (a) consists essentially of said composition (A2).

9. The molding material for laser welding according to claim 7, wherein said rubber-reinforced resin (A1) has a graft ratio of 20 to 200 wt %.

10. The molding materials for laser welding according to claim 8, wherein said rubber-reinforced resin (A1) has a graft ratio of 20 to 200 wt %.

* * * * *